United States Patent [19]

Havener et al.

[11] 3,966,007
[45] June 29, 1976

[54] ELECTRICBIKE

[75] Inventors: Ralph L. Havener, Decatur; Harry F. Dunakey, Harristown, both of Ill.

[73] Assignee: Lectra Bike Corporation, Decatur, Ill.

[22] Filed: Nov. 20, 1974

[21] Appl. No.: 525,463

[52] U.S. Cl. .............................. 180/34; 180/33 D
[51] Int. Cl.² ........................................... B60K 1/00
[58] Field of Search .................. 180/34, 33 D, 65 A

[56] References Cited
UNITED STATES PATENTS

| | | | |
|---|---|---|---|
| 627,066 | 6/1899 | Schnepf | 180/34 |
| 656,323 | 8/1900 | Hansel | 180/34 |
| 688,838 | 12/1901 | Dorsey | 180/33 D |
| 1,158,311 | 10/1915 | Schunk | 180/33 D |
| 1,191,287 | 7/1916 | De Vaux | 180/33 D |
| 1,436,788 | 11/1922 | Baker | 180/33 D |
| 2,031,881 | 2/1936 | Evinrude | 180/33 D |
| 2,451,965 | 10/1948 | Longenecker | 180/33 D |
| 2,578,886 | 12/1951 | Isherwood | 180/33 D |
| 2,586,082 | 2/1952 | Piatti | 180/33 D |
| 3,773,131 | 11/1973 | Jaulmes | 180/34 |

FOREIGN PATENTS OR APPLICATIONS

| | | | |
|---|---|---|---|
| 379,324 | 3/1940 | Italy | 180/34 |
| 109,327 | 12/1943 | Sweden | 180/34 |

*Primary Examiner*—M. H. Wood, Jr.
*Assistant Examiner*—Terrance L. Siemens
*Attorney, Agent, or Firm*—Wegner, Stellman, McCord, Wiles & Wood

[57] ABSTRACT

An electric drive for a diamond frame bicycle which has a pair of upwardly diverging struts connected to the bicycle lug, a pair of wheel mounting struts which extend rearwardly from the lug to carry a driven wheel. A battery in a case is supported by the upwardly diverging struts. A motor carrier is pivotally mounted on the frame adjacent the driven wheel. A motor and a friction wheel are mounted on the carrier and the friction wheel is driven by the motor. The friction wheel has a mounting attached to the frame by adjustable braces to move the friction wheel into and out of a driving engagement with the driven wheel. A circuit which includes a control switch connects the motor with the battery. The battery case, motor carrier and friction wheel mountings have adjustable members which allow them to be mounted on bicycle frames of different configuration.

5 Claims, 4 Drawing Figures

U.S. Patent June 29, 1976 3,966,007
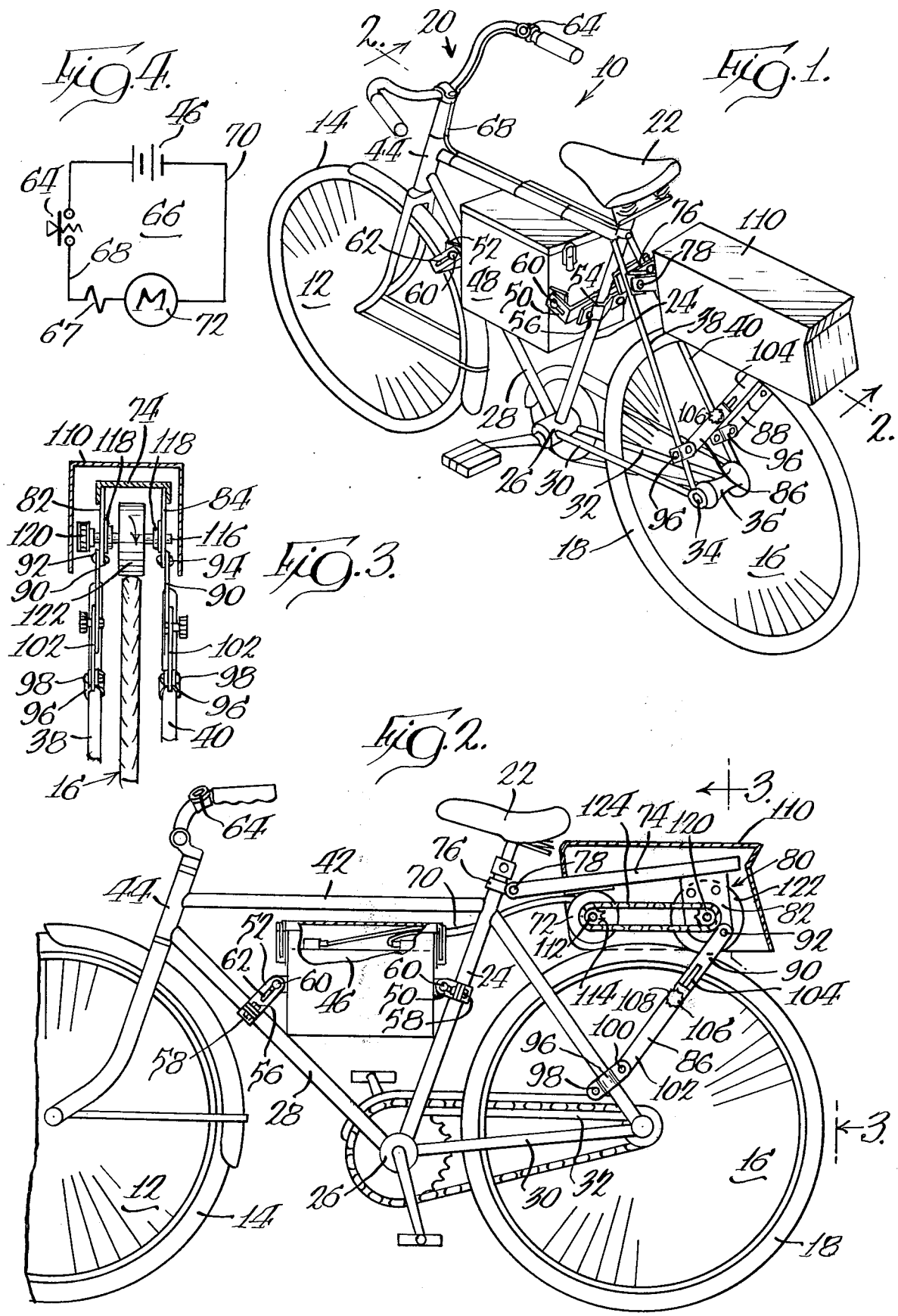

ELECTRICBIKE

BACKGROUND OF THE INVENTION

This invention relates to an electric drive for a multi-wheeled vehicle as a bicycle, and more particularly to a drive kit which may readily be installed on a variety of bicycle frames.

In recent years, bicycles have become an increasingly popular mode of transportation and recreation. Although bicycle riding is an invigorating sport which is especially enjoyed by the young, there are times when a person who is young in spirit but works in a sedentary occupation needs a breather from pedaling his bike to work or on a family outing. In fact, a very strenuous pedaling of a bicycle up a hill or over a very long distance might even be harmful to such an individual's health. In this situation, a bicycle that can be motorized but yet does not add to the general pollution from automobiles is desirable.

SUMMARY OF THE INVENTION

It is a primary object of the invention to provide a vehicle of transportation for work and recreational activity that can be used by people of all ages without adding to the smog which is caused by combustion engines, especially in urban areas.

It is a further object of this invention to provide an electric drive for a multiwheeled vehicle with a tubular frame which has adjustable mounting members to fit a variety of such vehicles without requiring special parts or tools for installation.

It is still another object of this invention to provide an electric drive for propelling a multiwheeled vehicle with a tubular frame which has a readily disengageable drive assembly that can be effected by a simple knob adjustment to lengthen adjustable braces of a pivotal drive mounting or by the easy removal of the entire drive.

In accordance with the present invention, an electric drive is provided for a bicycle which has a longitudinally extending frame including a pair of upwardly diverging struts and a pair of wheel-mounting struts extending rearwardly from the rearmost of said diverging struts. A driven wheel on the bicycle is carried by the wheel-mounting struts. The electric drive includes a battery which is supported by the diverging struts, a motor carrier which is mounted on the frame adjacent to the driven wheel, a motor which is on the carrier, a friction wheel which is driven by the motor, an adjustable mounting which moves the friction wheel into and out of a driving engagement with the driven bicycle wheel, and a circuit for connecting the motor with the battery via a control switch.

In another feature of the invention, the friction wheel is mounted on the underside of the motor carrier which is pivotally connected to the bicycle frame. This permits the friction wheel to engage with the driven wheel.

In still another feature of the invention, adjustable braces are connected between the friction wheel mounting and the bicycle frame to hold the friction wheel in or out of the driving engagement with the driven bicycle wheel.

In yet another feature of the invention, the battery has a casing with pivotally adjustable split collars for attachment to a variety of upwardly diverging struts on different bicycles and the motor carrier and adjustable braces also have pivotally adjustable split collars for attachment to a variety of bicycle frames.

In a further feature of this invention, the electrical circuit includes a normally open, pressure activated switch which connects the motor with the battery. A solenoid for overload protection is connected in series between the switch and motor. By closing the switch, the motor is energized by the battery to drive the friction wheel which is drivingly engaged with the driven bicycle wheel and the motor is deenergized by the solenoid if an overload occurs in the circuit.

Other objects and advantages of the invention will become apparent upon reading the following detailed description and upon reference to the drawings.

BRIEF DESCRIPTION OF THE DRAWINGS

FIG. 1 is a perspective of a diamond frame bicycle with the electric drive mounted upon it;

FIG. 2 is a side elevation view of the bicycle with the carrier and drive assembly in section taken along line 2—2 of FIG. 1;

FIG. 3 is a broken section of the carrier and drive mounting taken along line 3—3 of FIG. 2; and FIG. 4 is a schematic diagram of the drive circuit with a spring-loaded control switch.

DESCRIPTION OF THE PREFERRED EMBODIMENT

One embodiment of the electric drive for a multi-wheeled vehicle with a tubular frame made according to the invention is illustrated in FIG. 1 and is seen mounted on a diamond frame bicycle 10. The bicycle 10 has a front wheel 12 with a tire 14 and a rear wheel 16 with a tire 18. The bicycle includes handlebars 20 for steering the vehicle. The rider sits on a saddle 22 at the top of a seat tube 24. A lug 26 is at the bottom of the seat tube 24. A down tube 28 is attached to the front of the lug 26 and, together with a seat tube 24 forms a pair of upwardly diverging struts on the bicycle frame. Two chain stays 30 and 32 extend rearwardly from the rear of the lug 26. At the other end, the chain stays 30 and 32 become wheel-mounting struts which are connected to either end of a spindle 34 extending through a hub 36 of the rear wheel 16. The two down stays 38 and 40 are connected between the seat tube 24 and the wheel mounting struts 30 and 32 to form two triangles. A main tube 42 which a rider straddles is connected between the seat tube 24 and a head tube 44. The head tube 44 is also connected to the handlebars 20 and the down tube 28 to form another triangle.

The electric drive includes a battery 46 as shown in FIG. 2, such as a 12-volt deep cycle battery that will hold a charge longer and recharges quicker than a normal car battery or the like. The battery is housed in a case 48. The battery case 48 is mounted inside the triangle formed by the seat tube 24, down tube 28 and main tube 42 by pivotally and slidably adjustable brackets 50 and 52 which are connected to the seat tube 24 and the down tube 28, respectively. The mounting brackets 50 and 52 include a split collar 54 which is secured to the tubular struts 24 and 28 by means of a bolt 56 and a nut 58. The part of the split collar adjacent the battery case 48 is attached to the case by means of a pin 60 which is slidable in an elongated slot 62 on the collar. This slidable and pivotal connection of the brackets allows the battery case 46 to be mounted on a variety of bicycle frames without special parts or tools.

A spring-loaded control switch 64 is firmly attached to the handlebars 20 in a convenient location so that a finger of the rider can operate the switch while the same hand of the rider remains on the handlebar 20 for steering. The switch 64 is connected to an electric drive circuit 66 by an electric cable 68 which is strung along the handlebars and the tubular frame of the bicycle 10. A second cable 70 connects the battery 46 with a motor 72. A circuit breaker 67 for overload protection is connected in series between the switch 64 and the motor 72. The schematic diagram of FIG. 4 shows the electric drive circuit 66.

Now, turning to FIG. 2, a motor carrier 74, which is made of a sheet material, is disposed over the top of the rear tire 18 of bicycle 10. The carrier 74 is supported pivotally at its forward end by an adjustable collar 76 at its forward which is firmly clamped to the seat tube 24 or in the alternative to the down stays 38 and 40 in a manner similar to the split collar 54 of the battery support brackets 50 and 52. The carrier 74 pivots with respect to the bicycle frame 10 and adjustable collar 76 by a pin connection 78. Attached to the underside of the carrier 74 by supportive brackets and spaced a distance apart are the electric motor 72 and a drive assembly 80. The drive assembly 80 includes a pair of supportive brackets 82 and 84, a pair of downwardly extending adjustable braces 86 and 88 of a multiple piece construction which have one longitudinal member 90 that is pivotally connected to the support brackets 82 and 84 by pins 92 and 94 respectively, as best shown in FIG. 3.

Each adjustable brace terminates in an identical split collar 96 which attaches the adjustable braces 86 and 88 to the down stays 38 and 40, respectively. The split collar 96 is clamped to the down stay of the bicycle 10 by a screw 98 and by a screw 100 which swivally connects the split collar 96 to the other longitudinal member 102 of the adjustable brace.

The adjustment of each brace is provided by an elongated slot 104 and a screw-type fastener 106 slidable in the elongated slot 104. The fastener 106 has a knurled knob portion 108 for an easy hand adjustment of each brace. Loosening the fasteners 106 permits the longitudinal members 90 and 102 of each brace to slide axially relative to one another to control the effective length of the braces so that the drive assembly 80 on the pivotal carrier 74 can be brought into and out of a driving engagement with the driven wheel of the bicycle 10 without the requirement of tools.

In addition to the motor carrier 74 over the driven wheel 16, a housing 110 encloses the motor carrier 74, motor 72, and drive assembly 80 and also acts as a rear fender on the bicycle 10. The housing 110 also protects the rider from injury by accidentally coming into contact with the movable parts of the motor 72 or drive assembly 80 as well as protecting the electric drive from inclement weather.

Preferably, the motor 72 includes a motor shaft 112. A sprocket 114 is mounted on the motor shaft 112 for rotation therewith. The drive assembly 80 includes a drive shaft 116 which is parallel to the motor shaft 112 and is journaled in the pair of supportive brackets 82 and 84 by means of bearings 118, as best shown in FIG. 3, and a drive sprocket 120 which is mounted on the drive shaft 116 for rotation on the same side of the bicycle 10 as the motor sprocket 114. The drive assembly 80 further includes a friction wheel 122 mounted on the drive shaft 116 which extends below and between the supportive brackets 82 and 84. The friction wheel 122 has a rubber outer surface of a sufficient width to substantially match the surface of the tire 18.

Trained about the sprockets 114 and 120 is an endless drive chain 124. The chain 124 is driven by rotation of the motor shaft 112 and the upper end of the chain is directed along the path from the motor sprocket 114 to the drive sprocket 120 which in turn drives the friction wheel 122 on the drive shaft 116 in a clockwise direction.

In operation, the motor 72 is controlled by the switch 64 like the one illustrated in FIGS. 1 and 2. The circuit 66, which includes the control switch 64, connects the motor with the battery. Preferably, the switch 64 comprises a normally open, spring-loaded switch which may be closed manually through the applicaton of finger pressure, and which will automatically return to open condition upon release of such pressure to deenergize the motor 72.

The adjustable braces 86 and 88 are gradually shortened in length so that the rubber surface of the friction wheel 122 is lowered onto the tire 18 by pivoting the motor carrier 74 to whatever height is desirable for an optimum frictional engagement between the friction wheel 122 and the tire 18. The frictional engagement between the friction wheel 122 and the tire 18 is sufficient to turn the bicycle wheel 16 in a counterclockwise direction, but if the tire 18 remains stationary for one reason or another, the friction wheel 122 will slip on the tire 18 to prevent an overloading of the motor 72.

From the foregoing, it will be appreciated that an electric drive made according to the invention achieves the objective of providing an electric power system for propelling a multiwheeled vehicle through a frictionally engaging drive assembly which eliminates the more complicated drive assembly systems that are attached directly to the rear hub of the vehicle. Moreover, the same provides a simple, but effective, means whereby the drive assembly may be easily disengaged by a hand adjustment of the adjustable braces when a rider does not require the power system or it can be removed entirely from the vehicle without disassembly of the vehicle or the necessity of special tools.

We claim:

1. In an electric drive propelling a multiwheeled vehicle with a tubular frame, the combination comprising:

a battery secured to the frame;

a motor carrier pivotally connected to the frame adjacent a driven wheel, said carrier having a pair of supporting brackets extending downwardly from the underside of the carrier one on either side of the driven wheel, a pair of adjustable braces extending between the supporting brackets of the motor carrier and a vehicle frame member, said braces being pivotally connected to the supporting brackets and each brace terminating in a collar portion for attachment to the frame member, the effective length of the braces being selectable by hand adjustment to pivot the carrier toward and away from the driven wheel;

a motor secured to the underside of said carrier and including a shaft driven by the motor;

a motor sprocket mounted on said motor shaft;

a drive shaft journaled on the underside of said carriage;

a drive sprocket on said drive shaft;

a friction wheel mounted on said drive shaft for frictional engagement with the driven wheel of the vehicle;

an endless chain trained on said motor and drive sprockets for transferring the rotation of the motor shaft to the drive shaft whereby the friction wheel drives the vehicle; and a circuit having a normally open, spring-loaded control switch to connect the motor with the battery.

2. In an electric drive for a diamond frame bicycle having a first triangle formed by a seat tube, a main tube and a down tube, a second and third triangle formed by the seat tube, a pair of rearwardly extending chain stays and downwardly diverging down stays which join together rearwardly at their respective ends to form a rear wheel mounting support, and a driven rear wheel carried by said wheel mounting support, said drive comprising:

a battery located within said first triangle and supported by the seat and down tubes;

a motor carrier pivotally connected at its forward end to said seat tube or to said down stays, said carrier extending rearwardly from said pivotal mounting over said driven wheel;

a motor on the undersurface of said carrier;

a friction wheel;

a mounting for said friction wheel on the undersurface of the motor carrier, said mounting including a shaft and a pair of bearings on said motor carrier one on either side of said driven wheel, said friction wheel being rotatably supported between said bearings;

a drive connection between said motor and said friction wheel; and a pair of adjustable braces pivotally connected to said motor carrier at one end and attached to said down stays at the other end, each bracket having two longitudinally adjustable members and a manually actuable screw fastener with a knob to release said members for adjustment and to clamp said members in a fixed position, whereby said adjustable braces are increased or decreased in effective length to raise or lower the friction wheel out of or into driving engagement with the driven wheel.

3. The electric drive of claim 2 wherein said motor has a drive shaft with a sprocket thereon and said friction wheel shaft has a sprocket thereon, with a chain interconnecting said sprockets to drive said friction wheel from said motor.

4. The electric drive of claim 3 in which said carrier has a cover for said motor and drive wheel.

5. The electric drive of claim 4 in which said cover includes side and end walls extending around said motor and drive wheel protecting them from the weather and serving as a fender for said driven rear wheel of the bicycle.

* * * * *